United States Patent [19]

Hatori et al.

[11] Patent Number: 4,636,862
[45] Date of Patent: Jan. 13, 1987

[54] SYSTEM FOR DETECTING VECTOR OF MOTION OF MOVING OBJECTS ON PICTURE

[75] Inventors: Yoshinori Hatori, Kawasaki; Masahide Kaneko, Yokohama, both of Japan

[73] Assignee: Kokusai Denshin Denwa Kabushiki Kaisha, Tokyo, Japan

[21] Appl. No.: 699,001

[22] Filed: Feb. 7, 1985

[30] Foreign Application Priority Data

Feb. 13, 1984 [JP] Japan .................................. 59-24700

[51] Int. Cl.$^4$ .............................................. H04N 5/21
[52] U.S. Cl. .................................... 358/166; 358/105; 358/160; 358/167
[58] Field of Search ............... 358/166, 167, 160, 105; 382/27, 54, 55

[56] References Cited

U.S. PATENT DOCUMENTS

| 4,090,211 | 5/1978 | Connor | 356/166 |
| 4,296,436 | 10/1981 | Achiha | 358/167 |
| 4,361,853 | 11/1982 | Remy | 358/167 |
| 4,367,490 | 1/1983 | Riederer | 358/167 |
| 4,506,382 | 3/1985 | Hada | 358/166 |

Primary Examiner—Tommy P. Chin
Attorney, Agent, or Firm—Robert E. Burns; Emmanuel J. Lobato; Bruce L. Adams

[57] ABSTRACT

A system for detecting the vector of motion of a moving object on a picture screen, in which there is prepared, in addition to a picture memory for storing picture signals, a background memory for storing background picture signals. From the background memory, picture elements of a block #0b which lies at the same position on the screen as the current input block are read out and an inter-block difference B(#0', #0b) between the current input block #0' and the block #0b is calculated. If this gives rise to an uncovered background, then the above inter-block difference B(#0', #0b) between the picture memory and the background memory becomes smaller than any other inter-block differences (that is, the degree of similarity becomes the highest), and consequently, it is possible to judge that a new background portion has appeared. Incidentally, in connection with the background portion except the uncovered background, for example, a portion A' data in the picture memory and data in the background memory become identical, excepting noise components. Accordingly, in connection with this portion, the contents of the block #0 in the picture memory and the block #0b in the background memory differ little from each other, so that even if either the inter-block difference B(#0', #0) or B(#0', #0b) is chosen as a result of comparison of their magnitudes, substantially no characteristic deterioration is caused. For instance, in case of using the result of detection of movement for the movement-compensated predictive coding operation, the coding efficiency is hardly affected, even if either the block #0 or #0b is used for prediction.

2 Claims, 10 Drawing Figures

SYSTEM FOR DETECTING VECTOR OF MOTION OF MOVING OBJECTS ON PICTURE

BACKGROUND OF THE INVENTION

The present invention relates to a moving-vector detecting system which detects the vector of motion of a moving object on a picture through utilization of the correlation of video signals such as television signals present between successive pictures.

In case of moving of an object on a picture, an uncovered background results as a background remaining after the movement of the object. With the conventional moving-vector detecting system, it is essentially impossible to detect this uncovered background object, and in addition, a fultile attempt to detect the uncovered background which is primarily impossible of detection has also resulted in the reduction of the overall detecting accuracy as understood from the following detailed description.

SUMMARY OF THE INVENTION

An object of the present invention is to provide a system for detecting the vector of movement of a moving object on a screen which permits a marked reduction of detection errors resulting from the uncovered background, thereby obviating the defects of the above-described prior art.

According to the present invention, there is prepared, in addition to a picture memory for storing picture signals, a background memory for storing background picture signals. From the background memory, picture elements of a block #0b which lies at the same position on the screen as the current input block are read out and an inter-block difference B(#0', #0b) between the current input block #0' and the block #0b is calculated. If this gives rise to the uncovered background, then the above inter-block difference B(#0', #0b) between the picture memory and the background memory becomes smaller then any other inter-block differences (that is, the degree of similarity becomes the highest), and consequently, it is possible to judge that a new background portion has appeared. Incidentally, in connection with the background portion except the uncovered background, for example, the portion A', data in the picture memory and data in the background memory become identical to each other, excepting noise components. Accordingly, in connection with this portion, the contents of the block #0 in the picture memory and the block #0b in the background memory differ little from each other, so that even if either the inter-block difference B(#0', #0) or B(#0', #0b) is chosen as a result of comparison of their magnitudes, substantially no characteristic deterioration is caused. For instance, in case of using the result of detection of movement for the movement-compensated predictive coding operation, the coding efficiency is hardly affected, even if either the block #0 or #0b is used for prediction.

BRIEF DESCRIPTION OF THE DRAWINGS

The present invention will be described in detail below in comparison with conventional art with reference to the accompanying drawings, in which.

DETAILED DESCRIPTION

Figure 1:
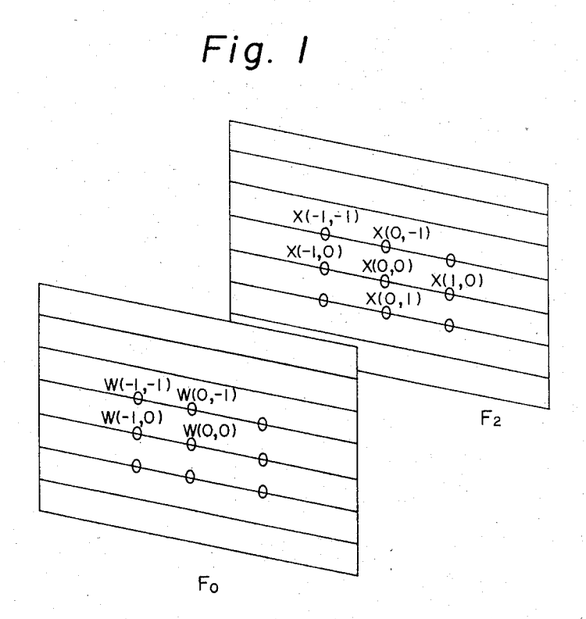
FIG. 1 is a schematic diagram showing the positional relationships of picture elements on a picture to which is applied the system of the present invention for detecting the vector of motion of a moving object on the picture.

To make differences between the present invention and conventional art clear, a description will be given first of moving-vector detecting system heretofore employed. The following description will be given in connection with a picture signal obtained by sampling and digitizing a TV signal. Accordingly, the picture signal is represented by an assembly of arrays of dots converted into sampled numerical information and commonly referred to as "picture elements". FIG. 1 shows the positional relationships of respective picture elements of the picture signal which are used in the moving-vector detecting system. Reference character $F_0$ indicates the current field and $F_2$ the field before last preceeding field. In the case of a TV signal, the interlaced scanning technique is employed; namely, scanning is effected at vertically different positions in two adjacent fields but at the same positions of every other field. The scanning signals of these two fields are combined to form one picture, which is therefore called one frame, but the moving-vector detecting system usually employs picture signals of the immediately preceding frame. FIG. 1 illustrates the positional relationships of picture elements of the current field $F_0$ and the field $F_2$ before the last (i.e. the immediately preceding frame) which are used in the moving-vector detecting system.

Now, let the current input picture element, the next picture element on the left side thereof one sample point ahead thereof in order of scanning and a picture element one scanning line ahead of the current picture element, be identified by notations $w(0, 0)$, $w(-1, 0)$ and $w(0, -1)$, respectively. Further, a picture element in the field $F_2$ at the same position as the current picture element $w(0, 0)$ will hereinafter identified by a notation $x(0, 0)$, and picture elements lying immediately on the left side of, just above, immediately right side of and just below the picture element $x(0, 0)$ will similarly be identified by notations $x(-1, 0)$, $x(0, -1)$, $x(1, 0)$ and $x(0, 1)$, respectively. Incidentally, in the example of FIG. 1, the sample points are arranged in an orthogonal form, and this corresponds to the case where the sampling frequency is selected so as to be an integral multiple of the horizontal scanning frequency, but they may also be arranged in other forms, for example, in a checkered pattern.

First, picture signals of a suitable number m of picture element × n lines are consolidated into a block, and a subsequent processing is carried out in units of blocks (m and n being integers greater than one). If the block size is selected to be too small, then an error can result in the detection of the moving-vector under the influence of noise superimposed on the picture signals. On the other hand, too large a block size makes it impossible to detect a motion of small part in the picture. Besides, for example, in case of using the result of movement detection for predictive coding for movement compensation in high efficiency coding, since the amount of movement must be provided for each block, too large a number of blocks will lessen the effect of high efficiency coding. Accordingly, the block size is determined taking these factors into account; in the prior art, a block size of about 8 picture element × 8 lines is widely employed. In this specification, however, the following description will be given of the case of the block size being 2 picture elements × 2 lines, as shown in FIG. 2, for the sake of brevity.

Figure 2:
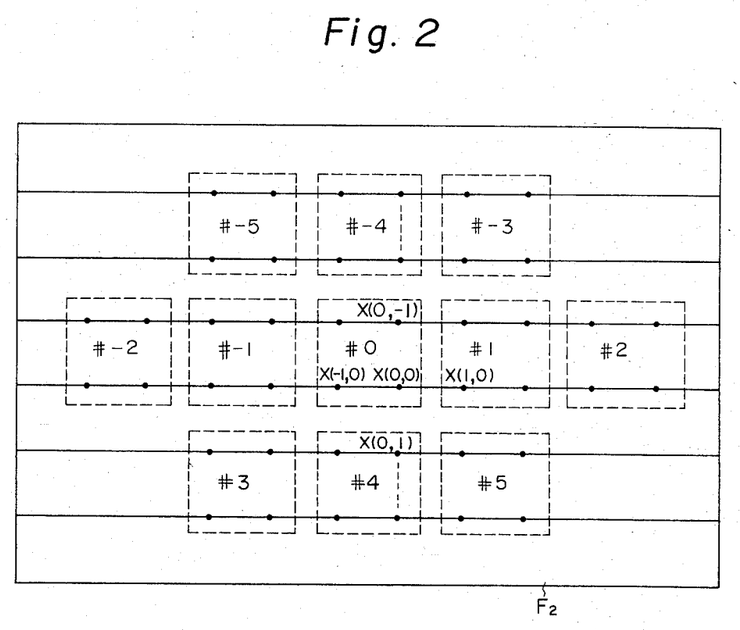
FIG. 2 is a diagram explanatory of picture element blocks for use in the present invention.

At this time, a proper number l plus one (l=10, #−5∼0∼#5 in FIG. 2) blocks are formed in the picture $F_2$ of the field before last, as shown in FIG. 2. In this case, the block #0 is one that lies at the same position as the current input picture element, and the other l blocks are selected from the blocks adjoining it. In FIG. 2, the respective blocks are shown to be selected to be adjacent but not to overlap one another; however, their positional relationships are free, and in the movement detecting system, an overlapping or spaced block arrangement can also be used. The accuracy of movement detection increases with an increase in the number of blocks to be selected in the preceding picture, but the number of blocks is determined in view of complexity which is involved in an actual processing operation.

Next, an inter-block difference B is calculated between a current-field input-picture-element block (hereinafter referred to as the block #0′) and the corresponding block in the preceding picture. At this time, an algorithm for calculating the inter-block difference B is selected in view of the complexity of the circuit arrangement for performing the calculation. It is a general practice in the art to use, as the inter-block difference, for example, the sum of square errors of differences between picture elements of the two blocks $$B(\#0', \#0) = \sum_{j=0,-1} \sum_{i=0,-1} |w(i,j) - (i,j)|^2 \quad (1)$$

where the notation $B(\#0', \#0)$ is an inter-block difference between the blocks #0′ and #0(In the case of the inter-block difference between the block #0′ and another block, the picture element value in the other block is used in place of #0. This applies in the following description.), or the sum of absolute values of differences between picture element values of two blocks $$B(\#0', \#0) = \sum_{j=0,-1} \sum_{i=0,-1} \{|w(i,j) - x(i,j)|\} \quad (2)$$

The following description will be made on the assumption that the inter-block difference is computed by using the sum of absolute values expressed by Eq. (2).

Now, inter-block differences $B(\#0', \#-5)$ to $B(\#0', \#5)$ are obtained for all the blocks #−5 to #5. Next, values of the inter-block differences B are checked, and blocks the inter-block difference B of which is the smallest are chosen as blocks having the highest degree of similarity. Incidentally, when two inter-block differences are equal to each other, the blocks having the highest degree of similarlity are unequivocally determined by selecting, for instance, blocks of smaller numbers. For example, when $$B(\#0', \#1) < B(\#0', \#i) \quad (3)$$

where i=−5 to 0, 2 to 5, the block #1 is regarded as the most approximate block having the highest degree of similarity to the block #0′ and it is judged that an object has moved from the block #1 to the block #0′, that is, from the right-hand side by two picture elements, in one frame. This is judged to be the vector of movement and the speed of the moving object on the picture at the position of the block #0′.

Figure 3:
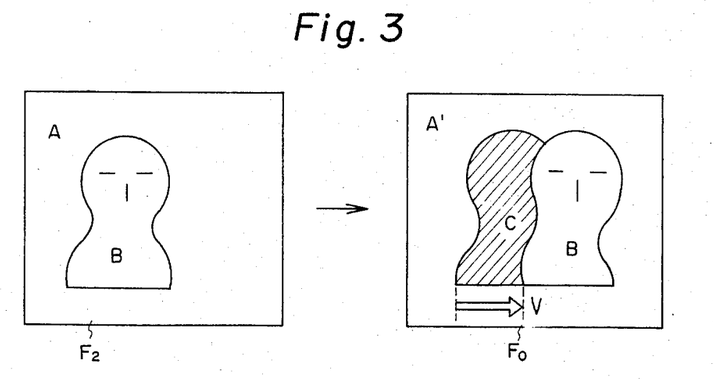
FIG. 3 is a schematic diagram explanatory of a region called as an uncovered background.

The above is the moving-vector detecting system heretofore employed. According to this system, as shown in FIG. 3, in the case where an object B exists in front of a background A, when the object B moves by a distance V, the motion of the region B and a region C, which is a part A′ of the region A, can be correctly detected. However, no blocks corresponding to the region C in FIG. 3 can be found out. This portion C is not the result of the motion of its own but a background remaining after the movement of the abovesaid object. Accordingly, this portion C is commonly referred to as an uncovered background. With the conventional moving-vector detecting system, it is essentially impossible to detect this portion C, and in addition, a futile attempt to detect the portion C which is primarily impossible of detection has also resulted in the reduction of the overall detecting accuracy as already mentioned. The present invention is proposed to eliminate the above defect of conventional art.

In the above, it poses a problem how the background portion is separated from the moving object and stored into the background memory. According to the present invention, the background separation can be achieved with a sufficiently high accuracy through the use of, for example, such a simple decision algorithm as follows: At the start of operation of the apparatus, the contents of the picture memory are stored into the background memory for the purpose of initialization. Next, inter-block differences $B(\#0', \#-5)$, . . . $B(\#0', \#5)$, and $B(\#0', \#0b)$ are compared with one another, and when the interblock difference $B(\#0', \#0b)$ is the smallest [that is, when the degree of similarity is the highest; this will hereinafter be referred to as the background mode], input picture signals are applied and stored into the background memory. On the other hand, in the case of other mode than the background mode, that is, when there exists in the picture memory a block which gives the smallest inter-block difference (i.e. the highest degree of similarity), the smallest inter-block difference $B(\#0', \#n)$ is compared with a first threshold value Th1. When it is detected that $B(\#0', \#n)$ is larger than or equal to the thresh-old value Th1, the contents of the background memory are updated. When the inter-block difference $B(\#0', \#n)$ is smaller than the first threshold value Th1, cases are classified according to the block number #n which provides the smallest inter-block difference, as follows: When the block number #n is not 0, that is, when it is decided that the motion in the picture is not zero [which will hereinafter be referred to as the moving picture mode, but even when $B(\#0', \#n) \leq Th1$, if $\#n \neq \#0$, it will be referred to as the moving picture mode.], the contents of the background memory are not updated by the current input picture signal but the values of picture elements previously stored into the background memory are retained.

On the other hand, when $\#n=0$, that is, when the motion is zero [which will hereinafter be referred to as the still picture mode, but even when $B(\#0', \#n) \leq Th1$, if $\#n=\#0$, it will be referred to as the still picture mode.], the interblock difference $B(\#0, \#0b)$ between the blocks $\#0$ and $\#0b$ is calculated. Then, when the interblock difference $B(\#0, \#0b)$ is smaller than a second threshold value Th2, that is, when the highest degree of similarity exceeds the second threshold value, the contents of the background memory are updated by the current input picture signal, whereas when the interblock difference $B(\#0, \#0b)$ is greater than the second threshold value Th2 or equal to the second threshold value Th2, the contents of the background memory are not updated.

A description will be given of a reason for which the background portion can be separated from the moving object by controlling, for each block, whether to update or not to update the contents of the background memory on the basis of the block number, which provides the smallest inter-block difference, and the value of the inter-block difference, as described above. First, in connection with the background mode portion, it is considered natural to update the background memory. Next, in the cases of the moving picture mode and the still ues of picture elements in the block $\#0b$ are compared with each other, and when the inter-block difference $B(\#0, \#0b)$ is smaller than a suitable second threshold value Th2, it is judged that this portion is the background, and the contents of the background memory are updated by new input picture signals. On the other hand, when the inter-block difference $B(\#0, \#0b)$ is larger than the second threshold value, it is judged that the foreground object is standing still by accident, and the memory contents are not updated.

Further, when the inter-block difference $B(\#0, \#n)$ is larger than the threshold value Th1, it is considered that the detection of motion has not satisfactorily been effected. It is considered that this is because the detected portion is the uncovered background portion and because correct values had not been stored into the background memory until then, or because a violent motion in excess of the range of detection occurs. In this case, since it is impossible to specify a particular one of the causes, the phenomen is regarded as a detection error by the uncovered background, and the contents of the background memory are rewritten by the contents of picture signals at that time.

Table 1 shows the above decision operations summarized. In the table, "input" indicates an operation of inputting the value of the current input picture signal to update the contents of the background memory and "retain" an operation of retaining the contents of the background memory without updating it.

As a result of this, the background, except its portions covered by foreground objects from the beginning to the end, can be separated from the moving object and stored in the background memory.

TABLE 1

|  | Moving picture mode $B(\#0', \#n)$ minimum (where $\#n \neq 0$) | Still picture mode $B(\#0', \#0)$ minimum | Background mode $B(\#0', \#0b)$ minimum |
|---|---|---|---|
| $B(\#0', \#m) < Th1$ (where m is any one of 0, n and 0b) | retain | $B(\#0, \#0b) < Th2$ input $B(\#0, \#0b) \geq Th2$ retain | input |
| $B(\#0', \#m) \geq Th1$ | input | input | input | picture mode portion, it is very likely that they are not backgrounds basically. In a case where the contents of the background memory are not updated for these portions, however, once erroneous data are stored into the background memory by some cause, the background mode is not selected thereafter, and in addition, since the contents of the background memory are not updated, the significance of the provision of the background memory will be lost essentially. Therefore, it is necessary that in these modes also, the contents of the background memory be updated under some conditions. It is considered that when the inter-block difference B is smaller than a suitable threshold value Th1 in the moving picture or still picture mode, the detection of movement is performed correctly to some extent. Accordingly, when the amount of motion is not zero, since it is judged that a certain object has moved, it is evident that this is not the background picture signal. Accordingly, the current input picture signal is not stored into the background memory. On the other hand, when the amount of motion is zero, there remains the possibility that it is a background signal or an object in the foreground happens to be standing still. Then, the values of picture elements in the block $\#0$ and the val- (Constitution and Operation of the Invention)

A description will be given of a specific example of a system for detecting the vector of motion of a moving object on a screen according to the present invention.

Figure 4:
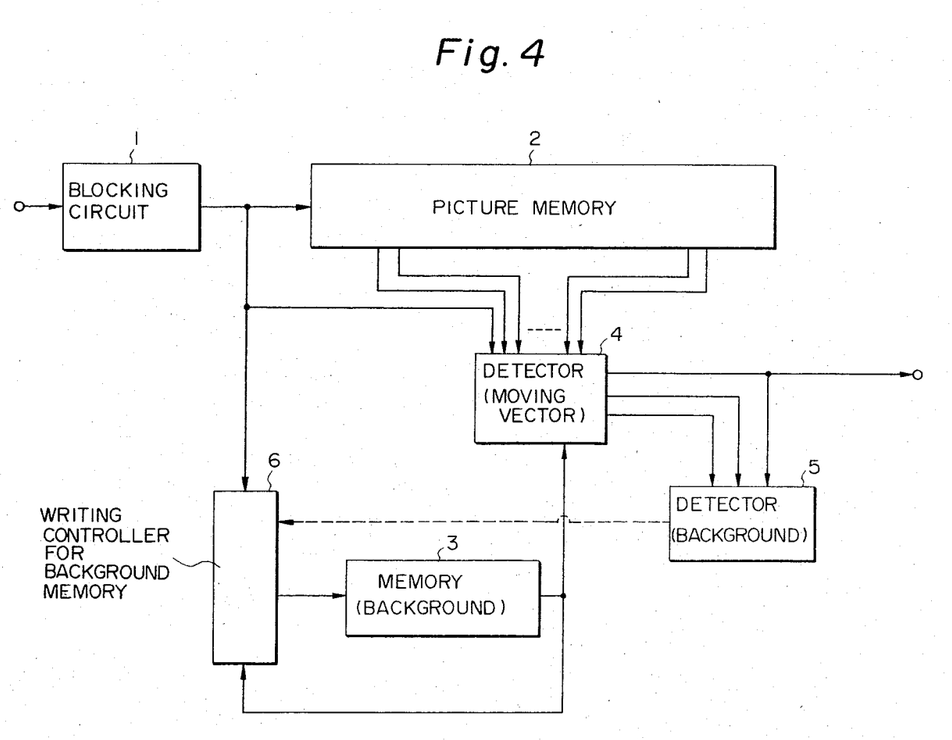
FIG. 4 is a block diagram illustrating an embodiment of the present invention.

FIG. 4 is a block diagram illustrating the motion detecting system of the present invention for detecting the moving-vector through the use of a background memory. In FIG. 4, reference numeral 1 indicates a blocking circuit for rearranging picture signals into blocks for performing subsequent processing in blocks; 2 designates a picture memory for storing input picture signals; 3 identifies a memory (refered as a background memory) for storing background picture signals; 4 denotes a detector (refered to a moving-vector detector) for calculating differences between information of respective blocks and comparing the differences with each other in terms of magnitude to thereby detect the vector of motion; 5 represents a detector (refered to a background detector) for separating the background portion on the basis of movement information and the values of inter-block differences produced by the moving-vector detector 4; and 6 shows a writing controller for background memory for selecting input signals of the background memory 3 on the basis of the result of decision by the background detector 5. The circuits 3, 4, 5 and 6 are principal characteristic circuits of the present invention for implementing the motion detecting system using the background information.

Figure 5:
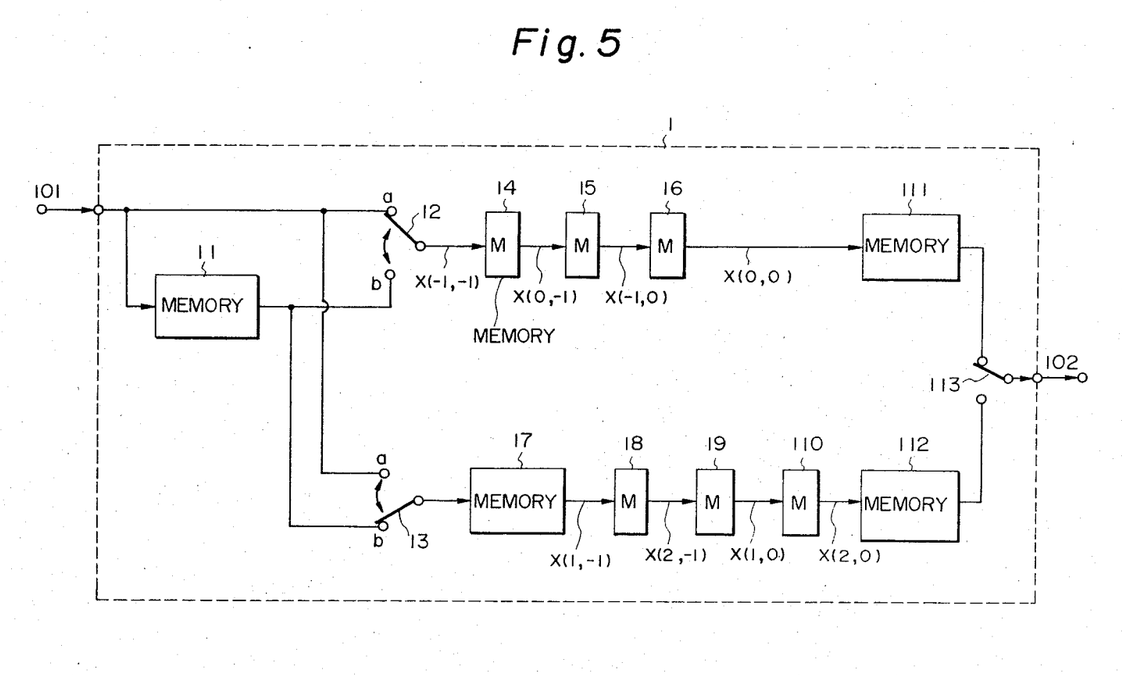
FIG. 5 is a block diagram illustrating an example of the arrangement of a blocking circuit used in the embodiment of FIG. 4.

A description will be given of an example of the arrangement of each circuit. FIG. 5 is a diagram illustrating an example of the arrangement of the blocking circuit 1 in FIG. 4. In FIG. 5, there is shown an arrangement for implementing the blocking operation by which a total of four picture elements of two picture elements×two lines, shown in FIG. 2, are consolidated into a block. In FIG. 5, reference numeral 11 indicates a memory for storing picture signals of one line and two picture elements; 14, 15, 16, 18, 19 and 110 designate memories for providing a delay corresponding to one picture element; 17 identifies a memory for providing a delay corresponding to two picture elements; and 111 and 112 denote memories for delaying picture signals of one line. Reference numerals 12 and 13 represent switches for selecting input picture elements which are consolidated into the block. For example, when picture elements (0, 0) and (−1, 0) arrive at the side a, the switch 12 is connected to the side a, and when picture elements (0, −1) and (−1, −1) arrive at the side b, the switch is changed over to the side b. In a similar manner, input picture elements for each block are selected. A similar operation is performed by the switch 13 as well, by which at a certain point of time, values of x(−1, −1) to x(0, 0) and x(1, −1) to x(2, 0) are read out at input/output points of the memories 14 to 16 and 18 to 110, as shown in FIG. 5. By the above operation, blocks, each covering two lines, are formed every other line in such a manner that they do not overlap one another, as shown in FIG. 2. Accordingly, values of the respective blocks are stored in the memories 111 and 112, each having a capacity of one line, and are read out via the switch 113 which is changed over to the above memories alternately with each other during a two-line period. By the above operations, values of blocked picture elements are sequentially read out at the output 102, and in a period in which picture data of two lines are input, picture block data of two lines are successively sent out to each of the succeeding circuits.

Figure 6:
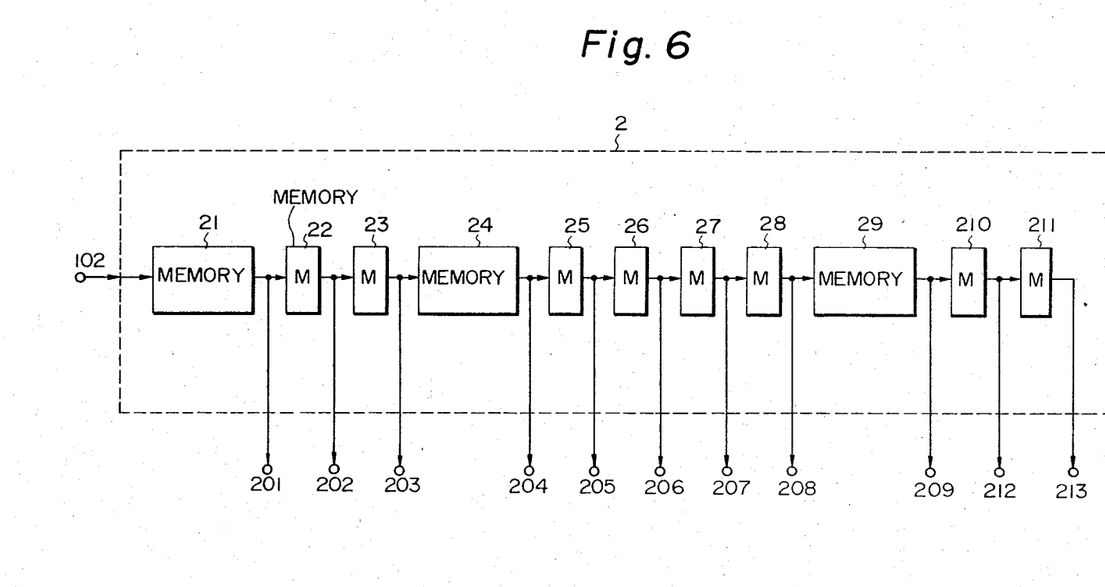
FIG. 6 is a block diagram illustrating an example of the arrangement of a picture memory used in the embodiment of FIG. 4.
Figure 7:
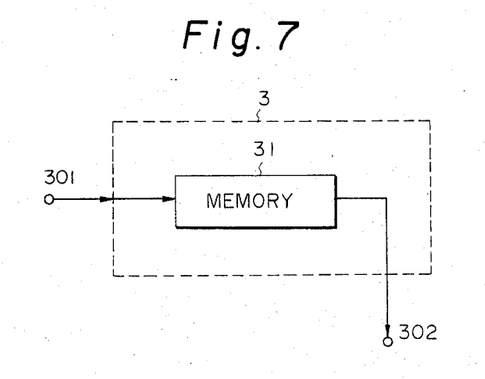
FIG. 7 is a block diagram illustrating an example of the arrangement of a background memory used in the embodiment of FIG. 4.

FIG. 6 illustrates an example of the arrangement of the picture memory 2 in FIG. 4 and FIG. 7 an example of the arrangement of the background memory 3 in FIG. 4. The both will hereinbelow be described together. In FIGS. 6 and 7, reference numerals 21 to 211 and 31 indicate memory for storing picture signals and delaying them as required. The delay times of the memory in FIG. 6 are determined as shown in Table 2, and the capacity of the memory 31 in FIG. 7 is determined to be 1F−1B (one frame minus one block). Incidentally, the notation 1F means a delay for one frame, 1L a delay for one line and 1B a delay for one block.

TABLE 2

| Number of memory part | Delay times at respective parts | Total delay times as viewed from input 102 |
| --- | --- | --- |
| 21 | 1F−2L−1B | 1F−2L−1B |
| 22 | 1B | 1F−2L |
| 23 | 1B | 1F−2L+1B |
| 24 | 2L−3B | 1F    −2B |
| 25 | 1B | 1F    −1B |
| 26 | 1B | 1F |

TABLE 2-continued

| Number of memory part | Delay times at respective parts | Total delay times as viewed from input 102 |
| --- | --- | --- |
| 27 | 1B | 1F    +1B |
| 28 | 1B | 1F    +2B |
| 29 | 2L−3B | 1F+2L−1B |
| 210 | 1B | 1F+2L |
| 211 | 1B | 1F+2L+1B |

By setting the delay times as mentioned above, picture element values of the respective blocks #−5 to #5 in FIG. 2 are read out at outputs 201 to 203 in FIG. 6, and picture element values of the block #0b are read out to an output 302 in FIG. 7. Incidentally, the capacity of the memory 31 is selected to be 1F−1B. The reason for this is that although a delay of one frame is required essentially, it is decreased by the delay time of one block in compensation for a delay which is needed for the background detector 5, described later, to make a necessary decision.

Figure 8:
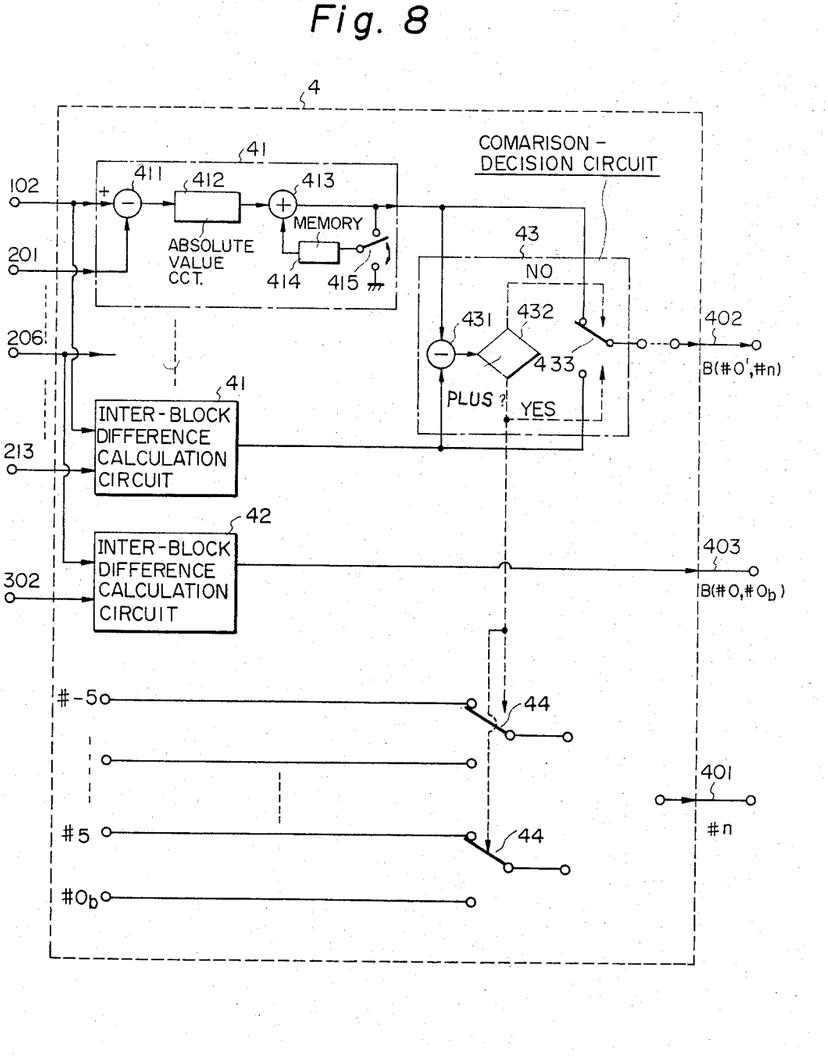
FIG. 8 is a block diagram illustrating an example of the arrangement of a moving vector detector used in the embodiment of FIG. 4.

FIG. 8 is a diagram illustrating an example of the arrangement of the moving-vector detector 4 in FIG. 4. In FIG. 8, picture signals of the block #0' are applied to the terminal 102, picture signals of the blocks #−5 to #5 are applied to the terminals 201 to 213, respectively, and picture signals of the block #0b are applied to the terminal 302. Reference numeral 41 indicates an inter-block difference calculation circuit for calculating the inter-block difference B, which is shown to obtain the inter-block difference between the blocks #−5 and #0. Similar inter-block difference calculation circuits are needed for calculating the inter-block differences between the other blocks #−4 to #5 and #0', but they are omitted in FIG. 8. In the inter-block difference calculation circuits 41, reference numeral 411 indicates a subtractor for calculating a difference, 412 an absolute value circuit for calculating an absolute value, 413 an adder for calculating the number of absolute values of one block, 414 a one-picture-element memory for providing a necessary delay and 415 a switch for clearing the contents of the memory 414 for each block. Reference numeral 42 designates an inter-block difference calculation circuit similar to the abovesaid one 41. The circuit 42 is identical in construction to the inter-block difference calculation circuit 41 but differs therefrom in that is uses, as input signals thereto, the picture signals of the blocks #0 and #0b from the terminals 206 and 302 and provides, at an output terminal 403, the inter-block difference between the block #0 in the picture memory 2 and the block #0b in the background memory 3.

Reference numeral 43 identifies a comparison-decision circuit for comparing the inter-block differences B in terms of magnitude. The number of such circuits 43 necessary for comparing all the inter-block differences with one another is the number of blocks minus one, but in FIG. 8, only one of them is shown. In the comparison-decision circuit 43, reference numeral 431 indicates a substractor for calculating the difference between two inter-block differences, 432 a plus/minus decision circuit for applying an ON-OFF control signal to the succeeding switching circuit 433 depending upon whether the difference is plus or minus and 433 a switch for selecting the smaller inter-block difference in accordance with the control signal. Further, the result of decision by the plus/minus decision circuit 432 is provided to the switch 433 for selecting the smallest block number, sequentially selecting block numbers which provide the smaller inter-block differences. By combining 1−1 pairs of such comparison-decision circuits 43 and selectors 44, the value of the smallest inter-block difference B(#0', #n) is finally obtained at the output 402 and the block number #n at that time is derived at the output 401.

Figure 9:
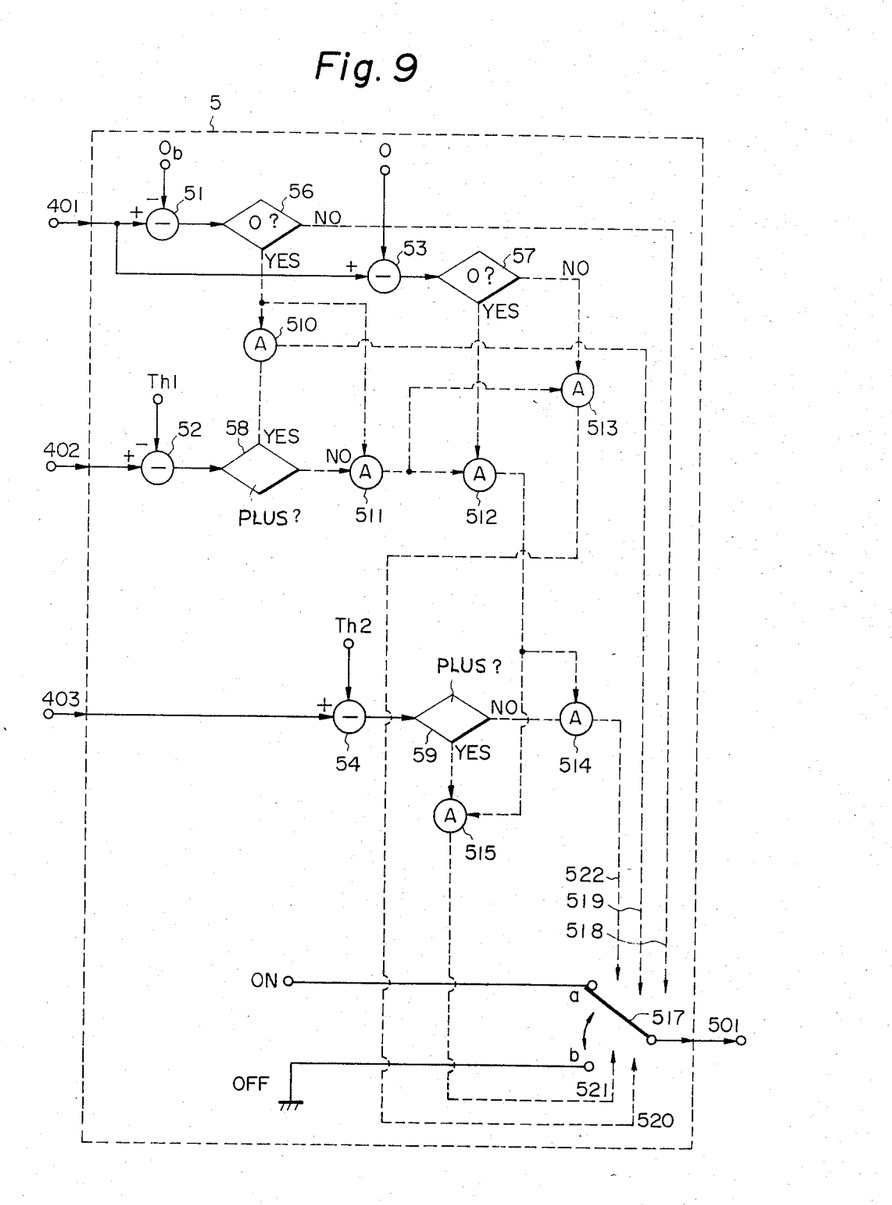
FIG. 9 is a diagram showing an example of the arrangement of a background detector utilized in the embodiment of FIG. 4.

FIG. 9 is a diagram illustrating an example of the arrangement of the background detector 5 in FIG. 4. In FIG. 9, reference numerals 51 to 54 indicate substractors, 56 to 59 decision circuits, 510 to 515 AND circuits and 517 a switch which outputs a control signal for instructing whether or not a new picture input signal is stored in the background memory.

A description will be given of the operation of this circuit. In a case where it is the block #0b in the background memory 3 that minimizes the inter-block difference, the decision circuit 56 provides an ON or OFF output on each of signal lines 518 and 510 depending upon whether or not the difference decided by the decision circuits 56 is zero. As a result of this, when the block #0b makes the inter-block difference the smallest, the signal line 518 is turned ON, connecting the switch 517 to the side a. On the other hand, in a case where the smallest block is not the block #0b and the inter-block difference input from the terminal 402 is larger than the threshold value Th1, the switch 517 is connected by the signal line 519 to the side a. When the inter-block difference is smaller than the threshold value Th1 and the amount of movement is not zero, the switch 517 is connected to the side b. Further, when the inter-block difference is smaller than the threshold value Th1 and the amount of movement is zero, the inter-block difference B(#0, #0b) between the block #0 in the immediately previous frame at the current position and the block #0b of the same position in the background memory 3 is input from the terminal 403 and compared with the threshold value Th2. At this time, if the inter-block difference B(#0, #0b) is greater than the threshold value Th2 or equal to the threshold value Th2, the switch 517 is connected by the signal line 521 to the side b, and if the inter-block difference is smaller than the threshold value Th2, the switch 517 is connected to the side a. Under the above conditions, the ON signal for the signal lines 518 to 512 is provided on only one of them, so that a write control signal for the background memory 3 can be unequivocally to a terminal 501.

Figure 10:
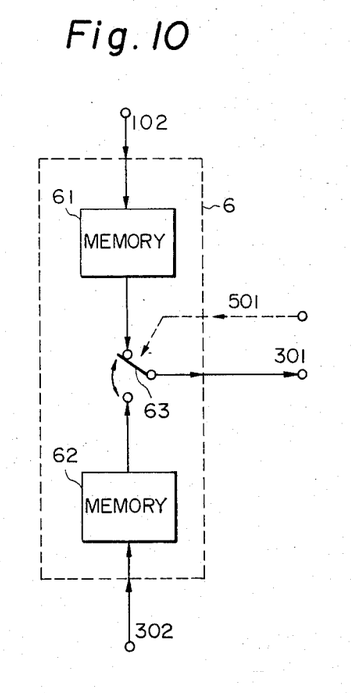
FIG. 10 is a block diagram illustrating an example of the arrangement of a writing controller for background memory used in the embodiment of FIG. 4.

FIG. 10 is a diagram explanatory of an example of the arrangement of the writing controller 6 in FIG. 4. In FIG. 10, reference numerals 61 and 62 indicate memories for providing a delay of one frame. They are provided for absorbing calculation delays in the moving vector detector 4 and the background detector 5 in FIG. 4. A switch 63 is one that selects either one of the input picture signal 102 and a feedback signal 302 from the background memory 3 in accordance with the control signal 501 from the background detector 5 and provides the input 301 to the background memory 3.
(Effect of the Invention)

As described above, according to the system of the present invention for detecting the vector of motion of a moving object on a picture, by separating the moving object and a background signal from each other and retaining the background signal separately, it is possible to prevent the occurrence of an erroneous detection of the vector of motion owing to the uncovered background or the like, thereby ensuring to raise the accuracy of movement detection. It is expected that the use of the present invention will provide a high coding efficiency in a high efficiency coding system or the like.

We claim:

1. A system for detecting the vector of motion of a moving object on a picture, comprising: a blocking circuit for blocking picture signals from the picture by steps of m picture elements x n lines (where m and n are integers greater than one); a picture memory connected to said blocking circuit for storing the picture signals of at least one frame or more in units of blocks; a background memory for storing, in units of blocks, background picture signals representing the background in the picture; a moving vector detector connected to said blocking circuit and said picture memory for selecting one block having the highest degree of similarity to a current input block on a current input frame in the picture signals from a block lying, at the same position as the current input block on said current input frame in the picture signals, on a picture of the immediately preceding frame read out of the picture memory, an adjoining block and a block lying, at the same position as the current input block, on the background stored in the background memory and for detecting the vector from one block selectred by the moving vector detector to the current input block and a distance between said one block and the current input block on the picture; and a background detector connected to said moving vector detector for updating by the current input block, a block stored in correspondence to the current input block in the background memory when the position of said one block selected on the picture, its location in the picture memory or the background memory and said degree of similarity coincide with a predetermined condition.

2. A system for detecting the vector of motion of a moving object on a picture according to claim 1, characterized in that the predetermined condition is defined as at least one of a first case in which a degree of similarity between the current input block and one block in the background memory corresponding in position on the picture to the current input block is the highest, a second case in which the highest degree of similarity is lower than a predetermined first threshold value and a third case in which when the highest degree of similarity is obtained, the distance detected by said moving vector detector is zero, the highest degree of similarity exceeds the predetermined first threshold value and a degree of similarity between blocks in the background memory and the picture memory, which correspond in position to the current input block on the picture, respectively, exceeds a predetermined second threshold value.

* * * * *